United States Patent
Patil

(10) Patent No.: US 10,754,822 B1
(45) Date of Patent: Aug. 25, 2020

(54) SYSTEMS AND METHODS FOR ONTOLOGY MIGRATION

(71) Applicant: Palantir Technologies Inc., Palo Alto, CA (US)

(72) Inventor: Mihir Patil, Cupertino, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 204 days.

(21) Appl. No.: 16/007,200

(22) Filed: Jun. 13, 2018

Related U.S. Application Data

(60) Provisional application No. 62/659,574, filed on Apr. 18, 2018.

(51) Int. Cl.
  *G06F 16/00* (2019.01)
  *G06F 16/11* (2019.01)

(52) U.S. Cl.
  CPC .................. *G06F 16/119* (2019.01)

(58) Field of Classification Search
  CPC ............. Y10S 707/966; Y10S 707/967; G06F 16/367; H04L 29/12028
  See application file for complete search history.

(56) References Cited

U.S. PATENT DOCUMENTS

| | | | |
|---|---|---|---|
| 5,109,399 A | 4/1992 | Thompson | |
| 5,329,108 A | 7/1994 | Lamoure | |
| 5,632,009 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |
| 5,818,737 A | 10/1998 | Orr et al. | |
| 5,845,300 A | 12/1998 | Comer | |
| 6,057,757 A | 5/2000 | Arrowsmith et al. | |
| 6,091,956 A | 7/2000 | Hollenberg | |
| 6,094,653 A | 7/2000 | Li et al. | |
| 6,161,098 A | 12/2000 | Wallman | |
| 6,167,405 A | 12/2000 | Rosensteel, Jr. et al. | |
| 6,219,053 B1 | 4/2001 | Tachibana et al. | |
| 6,232,971 B1 | 5/2001 | Haynes | |
| 6,247,019 B1 | 6/2001 | Davies | |

(Continued)

FOREIGN PATENT DOCUMENTS

| AU | 2014206155 | 12/2015 |
|---|---|---|
| AU | 2014250678 | 2/2016 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Cheryl Lewis
(74) *Attorney, Agent, or Firm* — Sheppard Mullin Richter & Hampton LLP

(57) ABSTRACT

Systems and methods are provided for migrating a source ontology for a source stack to a destination stack. The source ontology may define source objects that are associated with source data sets. The source data sets may correspond to destination data sets on a destination stack. The destination data set identifiers for the source data sets may be different from the destination data sets. Translation of the destination data set identifiers may enable migration of the source ontology to the destination stack.

19 Claims, 5 Drawing Sheets

(56) References Cited

U.S. PATENT DOCUMENTS

| | | |
|---|---|---|
| 6,279,018 B1 | 8/2001 | Kudrolli et al. |
| 6,289,338 B1 | 9/2001 | Stoffel et al. |
| 6,341,310 B1 | 1/2002 | Leshem et al. |
| 6,366,933 B1 | 4/2002 | Ball et al. |
| 6,369,835 B1 | 4/2002 | Lin |
| 6,430,305 B1 | 8/2002 | Decker |
| 6,456,997 B1 | 9/2002 | Shukla |
| 6,463,404 B1 | 10/2002 | Appleby |
| 6,523,172 B1 | 2/2003 | Martinez-Guerra et al. |
| 6,539,538 B1 | 3/2003 | Brewster et al. |
| 6,549,752 B2 | 4/2003 | Tsukamoto |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,643,613 B2 | 11/2003 | McGee et al. |
| 6,714,936 B1 | 3/2004 | Nevin, III |
| 6,748,481 B1 | 6/2004 | Parry et al. |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,027,974 B1 | 4/2006 | Busch et al. |
| 7,028,223 B1 | 4/2006 | Kolawa et al. |
| 7,036,085 B2 | 4/2006 | Barros |
| 7,043,702 B2 | 5/2006 | Chi et al. |
| 7,055,110 B2 | 5/2006 | Kupka et al. |
| 7,089,541 B2 | 8/2006 | Ungar |
| 7,117,430 B2 | 10/2006 | Maguire et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski et al. |
| 7,194,680 B1 | 3/2007 | Roy et al. |
| 7,237,192 B1 | 6/2007 | Stephenson et al. |
| 7,240,330 B2 | 7/2007 | Fairweather |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,533,069 B2 | 5/2009 | Fairweather |
| 7,554,993 B2 * | 6/2009 | Modi ............... H04L 29/12367 370/401 |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,685,083 B2 | 3/2010 | Fairweather |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,739,246 B2 | 6/2010 | Mooney et al. |
| 7,756,843 B1 | 7/2010 | Palmer |
| 7,761,407 B1 | 7/2010 | Stern |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,818,658 B2 | 10/2010 | Chen |
| 7,870,493 B2 | 1/2011 | Pall et al. |
| 7,877,421 B2 | 1/2011 | Berger et al. |
| 7,894,984 B2 | 2/2011 | Rasmussen et al. |
| 7,899,611 B2 | 3/2011 | Downs et al. |
| 7,899,796 B2 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,027,948 B2 * | 9/2011 | Akkiraju ................. G06N 5/02 706/55 |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,117,022 B2 | 2/2012 | Linker |
| 8,132,149 B2 | 3/2012 | Shenfield et al. |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,271,948 B2 | 9/2012 | Talozi et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,332,354 B1 | 12/2012 | Chatterjee et al. |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B2 | 4/2013 | Mianji |
| 8,418,085 B2 | 4/2013 | Snook et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |

(56) References Cited

U.S. PATENT DOCUMENTS

| | | |
|---|---|---|
| 8,489,623 B2 | 7/2013 | Jain et al. |
| 8,489,641 B1 | 7/2013 | Seefeld et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,494 B1 | 10/2013 | Downing |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,601,326 B1 | 12/2013 | Kirn |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,573 B1 | 4/2014 | Rukonic et al. |
| 8,689,108 B1 | 4/2014 | Duffield et al. |
| 8,689,182 B2 | 4/2014 | Leithead et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,799,867 B1 | 8/2014 | Peri-Glass et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,838,556 B1 | 9/2014 | Reiner et al. |
| 8,855,999 B1 | 10/2014 | Elliot |
| 8,868,537 B1 | 10/2014 | Colgrove et al. |
| 8,903,717 B2 | 12/2014 | Elliot |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,897 B2 | 1/2015 | Nassar |
| 8,937,619 B2 | 1/2015 | Sharma et al. |
| 8,938,434 B2 | 1/2015 | Jain et al. |
| 8,938,686 B1 | 1/2015 | Erenrich et al. |
| 8,949,164 B1 | 2/2015 | Mohler |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,100,428 B1 | 8/2015 | Visbal |
| 9,116,975 B2 | 8/2015 | Shankar et al. |
| 9,129,219 B1 | 9/2015 | Robertson et al. |
| 9,146,954 B1 | 9/2015 | Boe et al. |
| 9,164,795 B1 * | 10/2015 | Vincent ............... H04L 12/4633 |
| 9,197,489 B1 * | 11/2015 | Vincent ................ H04L 67/148 |
| 9,201,920 B2 | 12/2015 | Jain et al. |
| 9,208,159 B2 | 12/2015 | Stowe et al. |
| 9,223,773 B2 | 12/2015 | Isaacson |
| 9,229,952 B1 | 1/2016 | Meacham et al. |
| 9,230,060 B2 | 1/2016 | Friedlander et al. |
| 9,230,280 B1 | 1/2016 | Maag et al. |
| 9,280,532 B2 | 3/2016 | Cicerone |
| 9,576,015 B1 | 2/2017 | Tolnay et al. |
| 9,715,351 B2 * | 7/2017 | Patočka ................. G06F 3/065 |
| 9,946,738 B2 | 4/2018 | Meacham et al. |
| 2001/0056522 A1 | 12/2001 | Satyanarayana |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194058 A1 | 12/2002 | Eldering |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue |
| 2003/0074187 A1 | 4/2003 | Ait-Mokhtar et al. |
| 2003/0088438 A1 | 5/2003 | Maughan et al. |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0171942 A1 | 9/2003 | Gaito |
| 2003/0172053 A1 | 9/2003 | Fairweather |
| 2003/0177112 A1 | 9/2003 | Gardner |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044992 A1 | 3/2004 | Muller et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0095349 A1 | 5/2004 | Bito et al. |
| 2004/0103124 A1 | 5/2004 | Kupkova |
| 2004/0111410 A1 | 6/2004 | Burgoon et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0153837 A1 | 8/2004 | Preston et al. |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0091420 A1 | 4/2005 | Snover et al. |
| 2005/0102328 A1 | 5/2005 | Ring et al. |
| 2005/0125715 A1 | 6/2005 | Di Franco et al. |
| 2005/0143602 A1 | 6/2005 | Yada et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0095521 A1 | 5/2006 | Patinkin |
| 2006/0106847 A1 | 5/2006 | Eckardt et al. |
| 2006/0129746 A1 | 6/2006 | Porter |
| 2006/0129992 A1 | 6/2006 | Oberholtzer et al. |
| 2006/0139375 A1 | 6/2006 | Rasmussen et al. |
| 2006/0142949 A1 | 6/2006 | Helt |

(56) References Cited

U.S. PATENT DOCUMENTS

| | | |
|---|---|---|
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0184889 A1 | 8/2006 | Molander |
| 2006/0203337 A1 | 9/2006 | White |
| 2006/0209085 A1 | 9/2006 | Wong et al. |
| 2006/0218405 A1 | 9/2006 | Ama et al. |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0271277 A1 | 11/2006 | Hu et al. |
| 2006/0271838 A1 | 11/2006 | Carro |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0074169 A1 | 3/2007 | Chess et al. |
| 2007/0078832 A1 | 4/2007 | Ott et al. |
| 2007/0078872 A1 | 4/2007 | Cohen |
| 2007/0083541 A1 | 4/2007 | Fraleigh et al. |
| 2007/0094389 A1 | 4/2007 | Nussey et al. |
| 2007/0112714 A1 | 5/2007 | Fairweather |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0027981 A1* | 1/2008 | Wahl ................... G06F 16/258 |
| 2008/0034327 A1 | 2/2008 | Cisler et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0103996 A1 | 5/2008 | Forman et al. |
| 2008/0104019 A1 | 5/2008 | Nath |
| 2008/0104060 A1 | 5/2008 | Abhyankar et al. |
| 2008/0104407 A1 | 5/2008 | Horne et al. |
| 2008/0126951 A1 | 5/2008 | Sood et al. |
| 2008/0140387 A1 | 6/2008 | Linker |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0037417 A1 | 2/2009 | Shankar et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0199047 A1 | 8/2009 | Vaitheeswaran et al. |
| 2009/0210871 A1* | 8/2009 | Dechovich ............ G06F 9/4451 717/178 |
| 2009/0222400 A1 | 9/2009 | Kupershmidt et al. |
| 2009/0222760 A1 | 9/2009 | Halverson et al. |
| 2009/0228507 A1 | 9/2009 | Jain et al. |
| 2009/0234720 A1 | 9/2009 | George et al. |
| 2009/0235024 A1* | 9/2009 | Miki ..................... G06F 3/061 711/114 |
| 2009/0240664 A1 | 9/2009 | Dinker et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0281839 A1 | 11/2009 | Lynn et al. |
| 2009/0282097 A1 | 11/2009 | Alberti et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0310816 A1 | 12/2009 | Freire et al. |
| 2009/0313463 A1 | 12/2009 | Pang et al. |
| 2009/0319418 A1 | 12/2009 | Herz |
| 2009/0319891 A1 | 12/2009 | MacKinlay |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0082532 A1 | 4/2010 | Shaik et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114629 A1 | 5/2010 | Adler et al. |
| 2010/0114887 A1 | 5/2010 | Conway et al. |
| 2010/0115080 A1* | 5/2010 | Kageyama ........ H04L 29/12028 709/223 |
| 2010/0122152 A1 | 5/2010 | Chamberlain et al. |

(56) References Cited

U.S. PATENT DOCUMENTS

| | | |
|---|---|---|
| 2010/0125470 A1 | 5/2010 | Chisholm |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0204983 A1 | 8/2010 | Chung et al. |
| 2010/0211550 A1 | 8/2010 | Daniello et al. |
| 2010/0228786 A1 | 9/2010 | Torok |
| 2010/0228812 A1 | 9/2010 | Uomini |
| 2010/0235915 A1 | 9/2010 | Memon et al. |
| 2010/0250412 A1 | 9/2010 | Wagner |
| 2010/0257015 A1 | 10/2010 | Molander |
| 2010/0257515 A1 | 10/2010 | Bates et al. |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0181598 A1 | 7/2011 | O'Neall et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0213791 A1 | 9/2011 | Jain et al. |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0295795 A1 | 12/2011 | Venkatasubramanian et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Slier et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131512 A1 | 5/2012 | Takeuchi et al. |
| 2012/0137235 A1 | 5/2012 | TS et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290527 A1 | 11/2012 | Yalamanchilli |
| 2012/0290879 A1 | 11/2012 | Shibuya et al. |
| 2012/0296907 A1 | 11/2012 | Long et al. |
| 2012/0304150 A1 | 11/2012 | Leithead et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0006947 A1 | 1/2013 | Akinyemi et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0057551 A1 | 3/2013 | Ebert et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0091084 A1 | 4/2013 | Lee |
| 2013/0096988 A1 | 4/2013 | Grossman et al. |
| 2013/0097130 A1 | 4/2013 | Bingol et al. |
| 2013/0097482 A1 | 4/2013 | Marantz et al. |

(56) References Cited

U.S. PATENT DOCUMENTS

| | | |
|---|---|---|
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0124193 A1 | 5/2013 | Holmberg |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0198565 A1 | 8/2013 | Mancoridis et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226879 A1 | 8/2013 | Talukder et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0246316 A1 | 9/2013 | Zhao et al. |
| 2013/0246537 A1 | 9/2013 | Gaddala |
| 2013/0246560 A1 | 9/2013 | Feng et al. |
| 2013/0246597 A1 | 9/2013 | Iizawa et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0275446 A1 | 10/2013 | Jain et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2014/0012796 A1 | 1/2014 | Petersen et al. |
| 2014/0019423 A1 | 1/2014 | Liensberger et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0156617 A1 | 6/2014 | Tomkins |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0279979 A1 | 9/2014 | Yost et al. |
| 2014/0310266 A1 | 10/2014 | Greenfield |
| 2014/0316911 A1 | 10/2014 | Gross |
| 2014/0324876 A1 | 10/2014 | Konik et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0039886 A1 | 2/2015 | Kahol et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100559 A1 | 4/2015 | Nassar |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0112998 A1 | 4/2015 | Shankar et al. |
| 2015/0134666 A1 | 5/2015 | Gattiker et al. |
| 2015/0135256 A1 | 5/2015 | Hoy et al. |
| 2015/0142766 A1 | 5/2015 | Jain et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188715 A1 | 7/2015 | Castellucci et al. |
| 2015/0188872 A1 | 7/2015 | White |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0242397 A1 | 8/2015 | Zhuang |
| 2015/0261581 A1* | 9/2015 | Wang .................. G06F 9/45558 711/162 |
| 2015/0261817 A1 | 9/2015 | Harris et al. |
| 2015/0261847 A1 | 9/2015 | Ducott et al. |
| 2015/0324868 A1 | 11/2015 | Kaftan et al. |
| 2015/0338233 A1 | 11/2015 | Cervelli et al. |
| 2015/0341467 A1 | 11/2015 | Lim et al. |
| 2015/0347903 A1 | 12/2015 | Saxena et al. |
| 2015/0363241 A1* | 12/2015 | Misra ...................... G06F 9/461 718/104 |
| 2015/0378996 A1 | 12/2015 | Kesin et al. |
| 2015/0379413 A1 | 12/2015 | Robertson et al. |
| 2016/0004667 A1 | 1/2016 | Chakerian et al. |
| 2016/0004764 A1 | 1/2016 | Chakerian et al. |
| 2016/0034545 A1 | 2/2016 | Shankar et al. |
| 2016/0062555 A1 | 3/2016 | Ward et al. |
| 2016/0098173 A1 | 4/2016 | Slawinski et al. |
| 2016/0125000 A1 | 5/2016 | Meacham et al. |
| 2016/0147730 A1 | 5/2016 | Cicerone |
| 2017/0039253 A1 | 2/2017 | Bond |
| 2017/0068698 A1 | 3/2017 | Tolnay et al. |
| 2017/0083595 A1 | 3/2017 | Tolnay et al. |
| 2017/0097950 A1 | 4/2017 | Meacham et al. |
| 2018/0091625 A1* | 3/2018 | Hwang ............... H04L 41/0813 |

FOREIGN PATENT DOCUMENTS

| | | |
|---|---|---|
| CA | 2666364 | 1/2015 |
| CN | 102546446 | 7/2012 |
| CN | 103167093 | 6/2013 |

(56) References Cited

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014204840 | 9/2014 |
| DE | 102014213036 | 1/2015 |
| DE | 102014215621 | 2/2015 |
| EP | 0652513 | 5/1995 |
| EP | 1566758 | 8/2005 |
| EP | 1672527 | 6/2006 |
| EP | 1962222 | 8/2008 |
| EP | 2221725 | 8/2010 |
| EP | 2487610 | 8/2012 |
| EP | 2551799 | 1/2013 |
| EP | 2560134 | 2/2013 |
| EP | 2778913 | 9/2014 |
| EP | 2778914 | 9/2014 |
| EP | 2778977 | 9/2014 |
| EP | 2778986 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2897051 | 7/2015 |
| EP | 2911078 | 8/2015 |
| EP | 2963595 | 1/2016 |
| EP | 2993595 | 3/2016 |
| EP | 3018553 | 5/2016 |
| EP | 3128447 | 2/2017 |
| EP | 3142027 | 3/2017 |
| EP | 3258393 | 12/2017 |
| GB | 2366498 | 3/2002 |
| GB | 2513007 | 10/2014 |
| GB | 2516155 | 1/2015 |
| GB | 2517582 | 2/2015 |
| GB | 2518745 | 4/2015 |
| NL | 2012778 | 11/2014 |
| NL | 624557 | 12/2014 |
| NL | 2013134 | 1/2015 |
| NL | 2013306 | 2/2015 |
| NL | 2011642 | 8/2015 |
| WO | WO 2000/009529 | 2/2000 |
| WO | WO 2002/035376 | 5/2002 |
| WO | WO 2002/065353 | 8/2002 |
| WO | WO 2003/060751 | 7/2003 |
| WO | WO 2005/010685 | 2/2005 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2011/017289 | 5/2011 |
| WO | WO 2011/071833 | 6/2011 |
| WO | WO 2012/025915 | 3/2012 |
| WO | WO 2012/079836 | 6/2012 |
| WO | WO 2013/010157 | 1/2013 |
| WO | WO 2013/067077 | 5/2013 |
| WO | WO 2013/102892 | 7/2013 |

OTHER PUBLICATIONS

"A Quick Guide to UniProtKB Swiss-Prot & TrEMBL," Sep. 2011, pp. 2.

"A Tour of Pinboard," <http://pinboard.in/tour> as printed May 15, 2014 in 6 pages.

"A Word About Banks and the Laundering of Drug Money" Aug. 18, 2012, http://www.golemxiv.co.uk/2012/08/a-word-about-banks-and-the-laundering-of-drug-money/.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

"Potential Money Laundering Warning Signs," snapshot taken 2003, https://web.archive.org/web/20030816090055/http://finsolinc.com/ANTI-Money%20LAUNDERING%20TRAINING%20GUIDES.pdf.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"The FASTA Program Package," fasta-36.3.4, Mar. 25, 2011, pp. 29.

About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.

Acklen, Laura, "Absolute Beginner's Guide to Microsoft Word 2003," Dec. 24, 2003, pp. 15-18, 34-41, 308-316.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org.web/20061211011958/http://java.sun.com/developer/technicalArticles/J2SE/Desktop/javase6/modality/ Jan. 21, 2006, pp. 8.

Anonymous, "BackTult—JD Edwards One World Version Control System", in 1 page, Jul. 23, 2007.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-c553-ui-20120117/#resizing-amp-overflow retrieved on May 18, 2015.

Chaudhuri et al., "An Overview of Business Intelligence Technology," Communications of the ACM, Aug. 2011, vol. 54, No, 8.

Chen et al., "Bringing Order to the Web: Automatically Categorizing Search Results," CHI 2000, Proceedings of the SIGCHI conference on Human Factors in Computing Systems, Apr. 1-6, 2000, the Hague, the Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Cohn, et al., "Semi-supervised clustering with user feedback," Constrained Clustering: Advances in Algorithms, Theory, and Applications 4.1 (2003): 17-32.

Conner, Nancy, "Google Apps: The Missing Manual," May 1, 2008, pp. 15.

(56) References Cited

OTHER PUBLICATIONS

Countly Mobile Analytics, <http://count.ly/> Printed Jul. 18, 2013 in 9 pages.
Dean et al., "MapReduce: Simplified Data Processing on Large Clusters", OSDI 2004, 13 pages.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Distimo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Flurry Analytics, <http://www.flurry.com/> Printed Jul. 18, 2013 in 14 pages.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Glaab et al., "EnrichNet: Network-Based Gene Set Enrichment Analysis," Bioinformatics 28.18 (2012): pp. i451-i457.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautaum, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HIPC 2006, LNCS 4297, pp. 277-288, 2006.
Huff et al., "Calibrating the Huff Model Using ArcGIS Business Analyst," SSRI, Sep. 2008, pp. 33.
Huff, David L., "Parameter Estimation in the Huff Model," ESRI, ArcUser, Oct.-Dec. 2003, pp. 34-36.
Hur et al., "SciMiner: web-based literature mining tool for target identification and functional enrichment analysis," Bioinformatics 25.6 (2009): pp. 838-840.
Jelen, Bill, "Excel 2013 in Depth, Video Enhanced Edition," Jan. 25, 2013.
Johnson, Maggie, "Introduction to YACC and Bison".
Johnson, Steve, "Access 2013 on demand," Access 2013 on Demand, May 9, 2013, Que Publishing.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Kontagent Mobile Analytics, <http://www.kontagent.com/> Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
Mixpanel—Mobile Analytics, <https://mixpanel.com/> Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.

(56) References Cited

OTHER PUBLICATIONS

Niepert et al., "A Dynamic Ontology for a Dynamic Reference Work", Joint Conference on Digital Libraries, pp. 1-10, Vancouver, British Columbia, Jun. 17-22, 2007.
Nierman, "Evaluating Structural Similarity in XML Documents", 6 pages, 2002.
Nivas, Tuli, "Test Harness and Script Design Principles for Automated Testing of non-GUI or Web Based Applications," Performance Lab, Jun. 2011, pp. 30-37.
Olanoff, Drew, "Deep Dive with the New Google Maps for Desktop with Google Earth Integration, It's More than Just a Utility," May 15, 2013, pp. 1-6, retrieved from the Internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), <http://www.openwebanalytics.com/>, Printed Jul. 19, 2013 in 5 pages.
Osterweil et al., "Capturing, Visualizing and Querying Scientific Data Provenance", http://www.mtholyoke.edu/-blerner/dataprovenance/ddg.html, dated May 20, 2015, 3 pages.
Palantir Technologies, "Palantir Labs—Timeline," Oct. 1, 2010, retrieved from the internet https://www.youtube.com/watch?v=JCgDW5bru9M retrieved on Aug. 19, 2015.
Palantir, "Extracting and Transforming Data with Kite," Palantir Technologies, Inc., Copyright 2010, pp. 38.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "Kite," https://docs.palantir.com/gotham/3.11.1.0/adminreference/datasources.11 printed Aug. 30, 2013 in 2 pages.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema printed Aug. 30, 2013 in 2 pages.
Palantir, https://docs.palantir.com/gotham/3..1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Palmas et al., "An Edge-Bunding Layout for Interactive Parallel Coordinates" 2014 IEEE Pacific Visualization Symposium, pp. 57-64.
Piwik—Free Web Analytics Software. <http://piwik.org/> Printed Jul. 19, 2013 in18 pages.
Pythagoras Communications Ltd., "Microsoft CRM Duplicate Detection," Sep. 13, 2011, https://www.youtube.com/watch?v=j-7Qis0D0Kc.
Quest, "Toad for Oracle 11.6—Guide to Using Toad," Sep. 24, 2012, pp. 1-162.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, http://statcounter.com/> Printed Jul. 19, 2013 in 17 pages.
Symantec Corporation, "E-Security Begins with Sound Security Policies" Announcement Symantec, Jun. 14, 2001.
TestFlight—Beta Testing on the Fly, <http://testflightapp.com/> Printed Jul. 18, 2013 in 3 pages.
Thompson, Mick, "Getting Started with GEO," Getting Started with GEO, Jul. 26, 2011.
trak.io, <http://trak.io/> printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Federated Database System," Sep. 7, 2013, retrieved from the internee on Jan. 27, 2015 http://en.wikipedia.org/w/index.php?title=Federated_database_system&oldid=571954221.
Wikipedia, "Multimap," Jan. 1, 2013, https://en.wikipedia.org/w/index.php?title=Multimap&oldid=530800748.
Wourath et al., "A Distributed Object Model for the Java System," Proceedings of the 2nd Conference on USENEX, Conference on Object-Oriented Technologies (COOTS), Jun. 17, 1996, pp. 219-231.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Yang et al., "HTML Page Analysis Based on Visual Cues", A129, pp. 859-864, 2001.
Zaharia et al., "Resilient Distributed Datasets: A Fault-Tolerant Abstraction for In-Memory Cluster Computing" dated 2012, 14 pages.
Zheng et al., "GOEAST: a web-based software toolkit for Gene Ontology enrichment analysis," Nucleic acids research 36.suppl 2 (2008): pp. W385-W363.

* cited by examiner

SYSTEMS AND METHODS FOR ONTOLOGY MIGRATION

CROSS REFERENCE TO RELATED APPLICATIONS

This application claims the benefit under 35 U.S.C. § 119(e) of U.S. Provisional Application Ser. No. 62/659,574, filed Apr. 18, 2018, the content of which is incorporated by reference in its entirety into the present disclosure.

FIELD OF THE INVENTION

This disclosure relates to approaches for ontology migration.

BACKGROUND

Under some approaches, developers may need to utilize multiple stacks when developing software. For example, a developer may develop software on a developer stack, and then deploy the software to a production stack. As development progresses on a stack (e.g., a development stack), ontologies associated with the stack may be modified. Updating ontologies of corresponding stacks (e.g., a production stack) can be time consuming and computationally expensive. These and other drawbacks exist with conventional data management systems.

SUMMARY

A claimed solution rooted in computer technology overcomes problems specifically arising in the realm of computer technology. In various embodiments, a computing system is configured to migrate one or more ontologies between multiple stacks. For example, a source stack may have source data sets and a source ontology, and a destination stack may have destination data sets and a destination ontology. The source data sets and the destination data sets may correspond. In some implementations, however, the source data set identifiers for the source data sets may be different from the destination data set identifiers for the destination data sets. As such, migrating the source ontology to the destination stack may require translation of the destination data set identifiers.

In some embodiments, the source ontology for a source stack may be received. The destination data set identifiers may be translated to correspond to the source data set identifiers. For example, the destination data set identifiers may be translated into updated destination data set identifiers. In some embodiments, the source data set identifiers may be translated into updated source data set identifiers based on the relative locations of the source data sets on the source stack and/or the relative locations of the destination data sets on the destination stack. The source ontology may be migrated to the destination stack. In some embodiments, the migration may be based on translation of the destination data set identifiers, user input, and/or other information. The user input may indicate which source objects should be migrated to the destination stack, and/or which source objects should be excluded from the migration to the destination stack. In some embodiments, the source ontology may be migrated to the destination stack on a continuous or semi-continuous basis, responsive to user input, and/or responsive to a trigger event.

Migration of an ontology from a source stack to a destination stack is a problem that arises specifically in the realm of computer based programming (e.g., hardware programming and/or software programming). Software developers may be required to maintain multiple stacks (e.g., solution stacks or software stacks) when developing a software program, application, and/or platform. Applying an ontology for one stack to another stack is a tedious process that requires the developer to manually re-create the ontology by re-defining the definitions of data objects and potential links between the data objects defined by the ontology.

A source stack and a destination stack may have corresponding datasets with one or more different data set identifiers. Migration of an ontology from a source stack to a destination stack may require translation of the destination data set identifiers into updated destination data set identifiers that correspond to source data set identifiers. Implementations of the technology described herein may enable migration of a source ontology for a source stack to a destination stack. In some implementations, links between the source objects in the source ontology may be translated and/or migrated to the destination stack.

The technology may further provide a user interface through which a user may provide user input indicating which source objects should or should not be migrated to the destination stack. The technology may provide an auto-migration feature that may trigger migration of a source ontology to a destination stack based on one or more trigger events (e.g., updates to the source ontology, a user input initiating migration, the passage of an interval of time, the arrival of a predetermined date and/or time, and/or other trigger events). In some implementations, the system may provide a dataset correspondence feature that may determine and/or apply an offset to a destination stack such that the relative locations of the destination data sets on the destination stack correspond to the relative locations of the source data sets on the source stack. Applying an offset may ensure that the source ontology can be migrated to the destination stack responsive to their datasets not being identical.

In an implementation, a system for migrating an ontology is provided. The system may comprise one or more processors and a memory storing instructions. When executed by the one or more processors, the instructions may cause the system to receive a source ontology for a source stack that defines source objects associated with source datasets that correspond to destination datasets having destination data set identifiers that are different from source data set identifiers for the source datasets, receive the destination data set identifiers, translate the destination data set identifiers into updated destination data set identifiers that correspond to the source data set identifiers, and migrate the source ontology to the destination stack based on translation of the destination data set data set identifiers.

In another implementation, a computer implemented method of migrating an ontology is provided. The method may be performed on a computer system having one or more physical processors programmed with computer program instructions that, when executed by the one or more physical processors, cause the computer system to perform the method. The method may comprise receiving, by the computer system, a source ontology for a source stack that defines source objects associated with source datasets that correspond to destination datasets having destination data set identifiers that are different from source data set identifiers for the source datasets, receiving, by the computer system, the destination data set identifiers, translating, by the computer system, the destination data set identifiers into updated destination data set identifiers that correspond to the source data set identifiers, and migrating, by the computer system, the source ontology to the destination stack based on translation of the destination data set data set identifiers These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which

DETAILED DESCRIPTION

Figure 1:
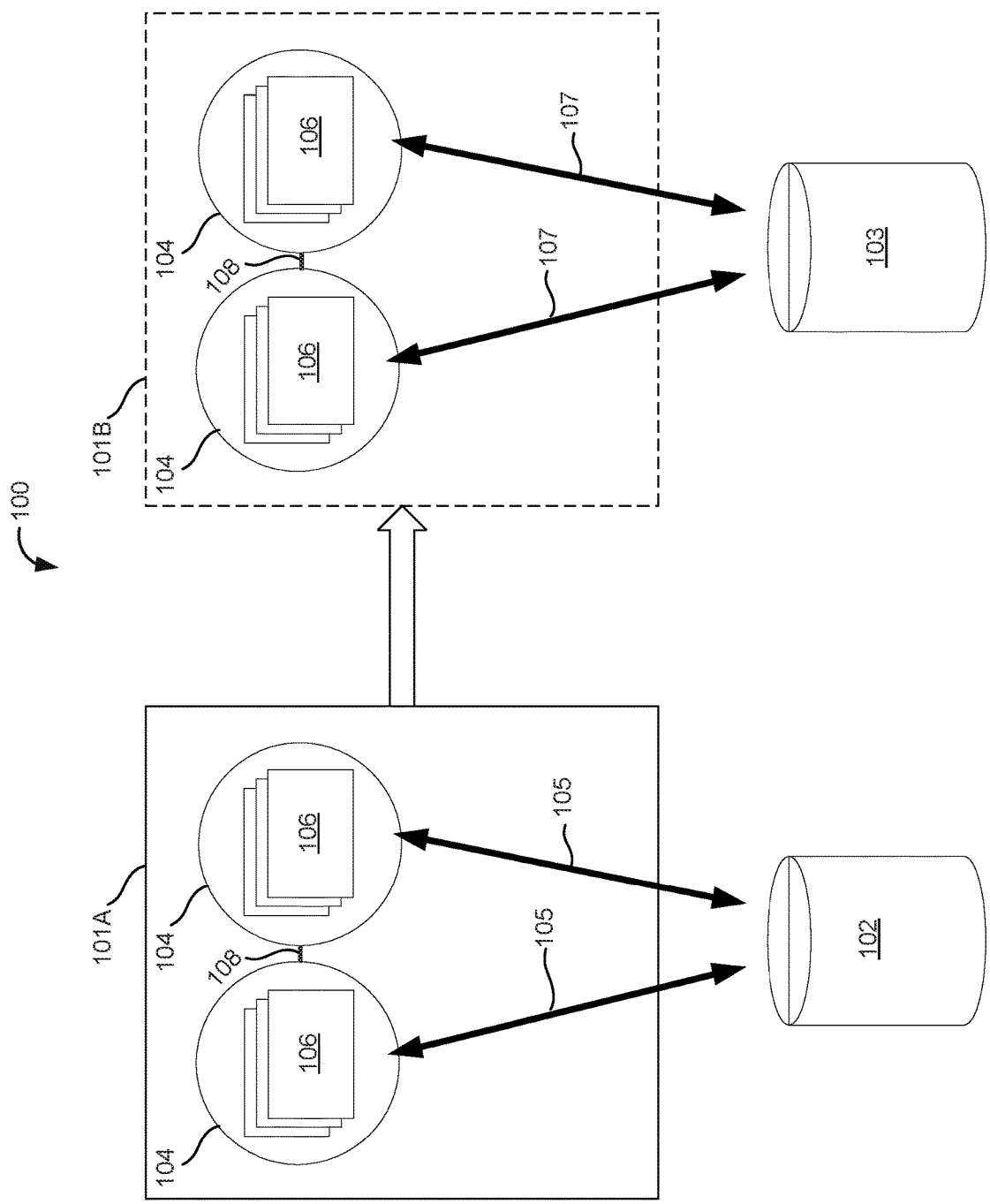
FIG. 1 depicts a system for migrating an ontology from a source stack to a destination stack, according to some implementations.

A claimed solution rooted in computer technology overcomes problems specifically arising in the realm of computer technology. In various implementations, the technology may facilitate an ontology migration between a source stack and a destination stack. Developers (e.g., software and/or hardware developers) may develop programs, applications, and/or platforms (e.g., software and/or hardware), using multiple stacks (e.g., solution stacks or software stacks). Accordingly, developers are not required to develop/test and produce/publish on the same stack. This enables developers to have one or more backup stacks, test on a different stack they publish on, perform updates and/or changes before publishing to customers, and/or the like. Migrating an ontology from one stack to another stack may be necessary to eliminate the requirement that developers manually re-create the same ontology, and/or manually update an ontology, on another stack with corresponding datasets. Due to the technical nature and structure of ontologies, developers cannot merely copy and paste from one stack to another as they would to migrate code. Instead, applying an ontology from a source stack to a destination stack is a tedious process that typically requires the developer to manually re-create the ontology on the destination stack by re-defining the definitions of data objects and potential links between the data objects. The technology described herein provides systems and methods for migrating an ontology from a source stack to a destination stack.

In various embodiments, a computing system is configured to migrate one or more ontologies between multiple stacks. For example, a source stack may have source data sets and a source ontology, and a destination stack may have destination data sets and a destination ontology. The source data sets and the destination data sets may correspond. In some implementations, however, the source data set identifiers for the source data sets may be different from the destination data set identifiers for the destination data sets. As such, migrating the source ontology to the destination stack may require translation of the destination data set identifiers.

In some embodiments, the destination data set identifiers of the source ontology may be translated to correspond to the source data set identifiers. For example, the destination data set identifiers may be translated into updated destination data set identifiers. In some embodiments, the source data set identifiers may be translated into updated source data set identifiers based on the relative locations of the source data sets on the source stack and/or the relative locations of the destination data sets on the destination stack. The source ontology may then be migrated to the destination stack. In some embodiments, the migration may be based on translation of the destination data set identifiers, user input, and/or other information. User input may indicate which source objects should be migrated to the destination stack, and/or which source objects should be excluded from the migration to the destination stack. In some embodiments, the source ontology may be migrated to the destination stack on a continuous and/or semi-continuous basis, responsive to user input, and/or responsive to a trigger event.

In some embodiments, a source stack and a destination stack may have corresponding datasets with one or more different data set identifiers. Migration of an ontology from a source stack to a destination stack may require translation of the destination data set identifiers into updated destination data set identifiers that correspond to source data set identifiers. Implementations of the technology described herein may enable migration of a source ontology for a source stack to a destination stack. In some implementations, links between the source objects in the source ontology may be translated and/or migrated to the destination stack. For example, links may each be associated with a link identifier, and the link identifiers may be translated (e.g., in the same and/or similar manner as the dataset identifiers).

In some embodiments, the technology may further provide a user interface through which a user may provide user input indicating which source objects should or should not be migrated to the destination stack. The technology may provide an auto-migration feature that may trigger migration of a source ontology to a destination stack based on one or more trigger events (e.g., updates to the source ontology, a user input initiating migration, the passage of an interval of time, the arrival of a predetermined date and/or time, and/or other trigger events). In some implementations, the system may provide a dataset correspondence feature that may determine and/or apply an offset to a destination stack such that the relative locations of the destination data sets on the destination stack correspond to the relative locations of the source data sets on the source stack. Applying an offset may ensure that the source ontology can be migrated to the destination stack responsive to their datasets not being identical.

Migration of an ontology from a source stack to a destination stack is a problem that arises specifically in the realm of computer based programming (e.g., hardware programming and/or software programming). For example, software developers may be required to maintain multiple stacks (e.g., solution stacks or software stacks) when developing a software program, application, and/or platform. Applying an ontology for one stack to another stack is a tedious process that requires the developer to manually re-create the ontology by re-defining the definitions of data objects and potential links between the data objects defined by the ontology.

FIG. 1 depicts a system 100 for migrating an ontology from a source stack to a destination stack. In the example of FIG. 1, the system 100 is centered around data objects 104. Each data object 104 may include several components 106. Components 106 may include one or more object properties, one or more data notes, one or more media components, and/or one or more data links. The origin of data sets associated with data object 104 may be stored in a source data record(s) 102 and/or destination data record(s) 103. Source data sets within source data source 102 may correspond to destination data sets within destination data source 103.

Ontologies 101 may define the data objects and how the data objects are linked to one or more other data objects associated via links 108. The ontology may be dynamic, updated to match evolving needs of the system and analysts. The ontology may define types of data objects 106, object properties, and data links 108. The ontology may further define which data types may be associated with each other. Each data types may have a URI (uniform resource identifier) that identifies it.

Object types may define features that may be represented in the system, and provide structure for data objects 104. Object types may be derived from, for example, entity types, event types, document types, and multimedia types. Event and document types may have temporal and geospatial data directly included within the data object 104 itself. An object type may define the number and composition of properties, notes, and/or media components of a data object(s) 104. The object type may further define what other types of objects that data links 108 may permit association with. For example, an entity object type may define a data object 104 used to store data about a person, and may include data properties for storing name, address, occupation, e-mail address, phone number, etc. Data links 108 of an entity object 104 may permit the entity object 104 to be linked to other entity objects (e.g., friends or business associates), linked to event objects (e.g., events attended or invited to), linked to document objects (e.g., authored), etc.

Property types may define the type and behavior of input data. Property types may define the structure of the data stored in an object property. The property type may define one or more data fields, the type of data associated with the field, as well as tools that may operate on the data fields. Property types may be simple, including a single data field, and/or may be composite, including multiple data fields. For example, an e-mail property type may define an e-mail object property. For example, the e-mail address john@acmeinc.com may be stored in an e-mail object property as follows: URI: com.property.Email, Base Type: Composite, with these components: EMAIL_USERNAME with the value "john," EMAIL_DOMAIN with the value "acmeinc.com." Further, the e-mail property type may define tools for parsing and concatenating the username and the domain, depending on what is required.

Link types may define the types of data links 108 that can exist between two objects 104. Links may be symmetric or asymmetric. All links may have one object that is considered the "parent" object, and the other that is the "child." In the case of symmetric links, e.g., "Spouse Of," which the parent and child objects are not contextually important. In the case of asymmetric links, like "Manager Of/Managed By," the parent and child may reflect the direction of the link.

Thus, the ontologies 101 of the object based data systems may define the way in which data is organized in the object based data systems. The ontology may define the types of objects that may be stored and the components of the defined data objects 104 as well as the manner in which the defined data objects may link to one another via data links 108.

Source ontology 101A may be migrated to a destination stack corresponding to destination data source 103. In some implementations, links 108 may be migrated to the destination stack with source ontology 101A. Destination ontology 101B may be updated and/or replaced responsive to the migration of destination ontology 101A.

Figure 2:
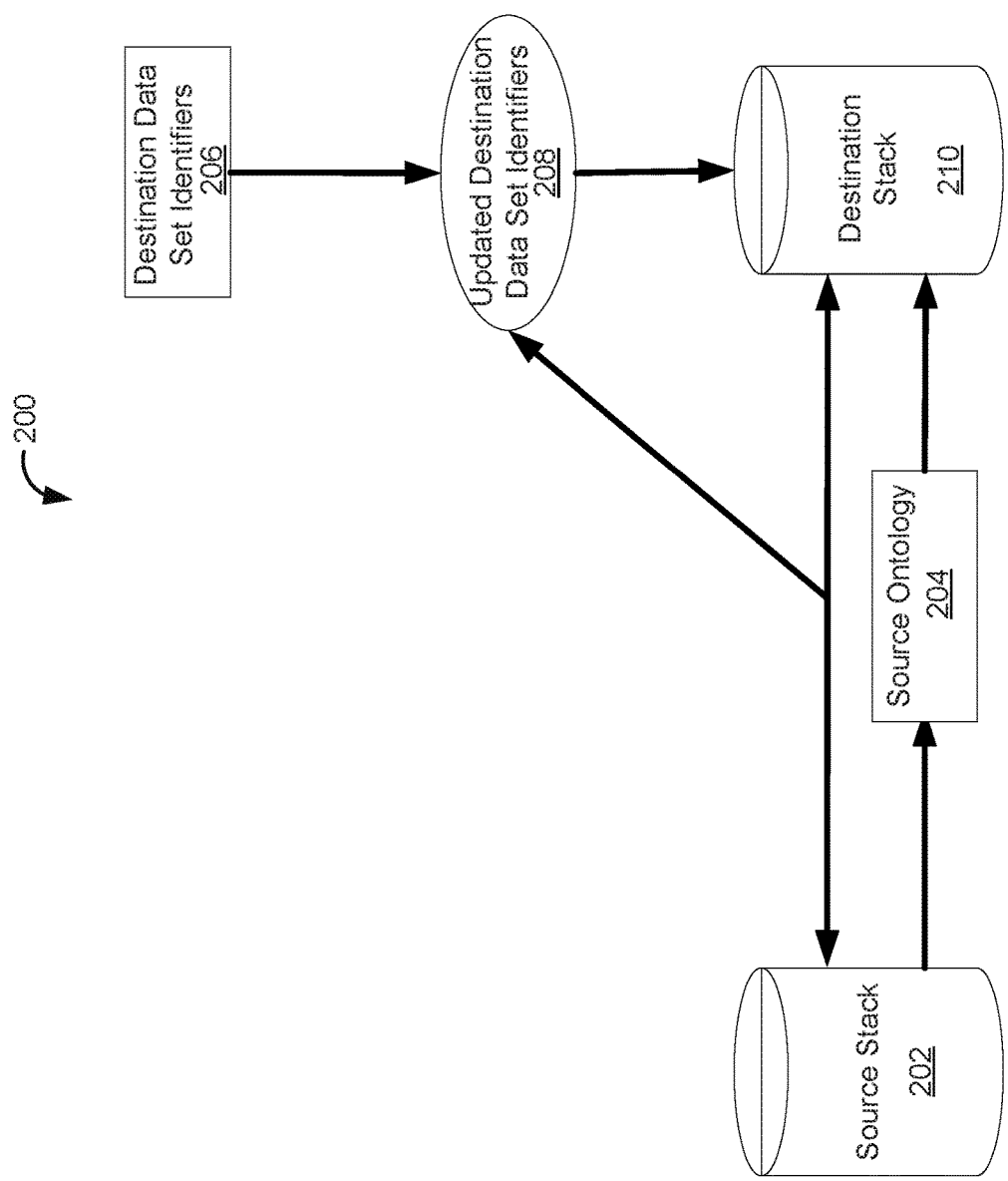
FIG. 2 depicts a process flow of an ontology migration, according to some implementations.

FIG. 2 depicts a process flow 200 of an ontology migration process, according to some implementations of the technology. In the process flow 200 illustrated in FIG. 2, source ontology 204 may be migrated to destination stack 210. Source ontology 204 may be received and/or obtained from source stack 202.

Destination data set identifiers 206 for destination data sets on destination stack 210 may be received and/or obtained. The source ontology 204 may define one or more source objects that are associated with source data sets having source data set identifiers. The source data sets may correspond to destination data sets on destination stack 210. The destination data sets may have destination data set identifiers that are different from the source data set identifiers. In some embodiments, the source data sets may be identical to the destination data sets, and/or the source data sets may be located in the same relative location on source stack 202 as the destination data sets are located on destination stack 210. The source data set identifiers may be different from the destination data set identifiers 206 even though their datasets correspond.

The destination data set identifiers 206 may be translated to generate updated destination data set identifiers 208. Updated destination data set identifiers 208 may correspond to the source data set identifiers for source data sets on source stack 202. In some implementations, the translation of destination data set identifiers 206 may be based on relative locations of source data sets on source stack 202 compared to the relative locations of the destination data sets on destination stack 210.

Source ontology 204 may be migrated to destination stack 210 responsive to translating the destination data set identifiers 206 into updated destination data set identifiers 208. In one embodiment, source ontology 204 may be used as a basis for updating a destination ontology for destination stack 210. Source ontology 204 may be processed and compared to the destination ontology for destination stack 210. Migrating source ontology 204 to the destination stack 210 may include identifying one or more differences between source ontology 204 and the destination ontology. Migrating source ontology 204 to destination stack 210 may include updating a destination ontology for destination stack 210 based on source ontology 204. Foy example, one or more of the differences identified may be updated responsive to migrating source ontology 204 to destination stack 210 such that the destination ontology matches the source ontology 204.

In one embodiment, source ontology 204 may replace at least one or more portions of the destination ontology for destination stack 210 such that at least one or more portions of the destination ontology for destination stack 210 match the source ontology 204 for the source stack 202. In some embodiments, one or more links between the source objects and/or the source ontology may be migrated to destination stack 210 with source ontology 204.

Figure 3:
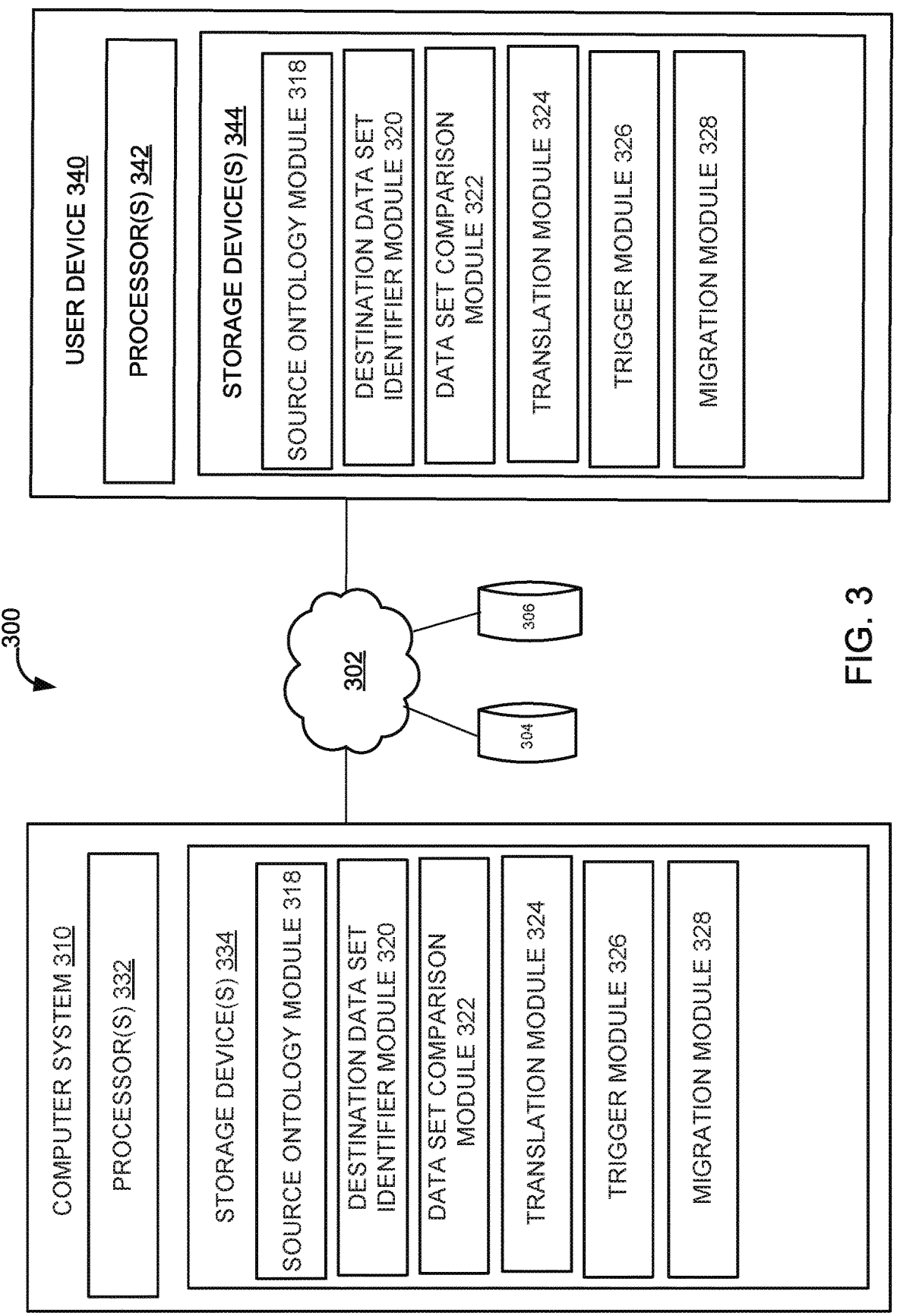
FIG. 3 depicts a system for migrating an ontology, according to some implementations.

FIG. 3 depicts a system 300 for migrating in ontology according to some implementations. In one implementation, system 300 may include a computer system 310, a user device 340, a tabular data module 304, and an object based data module 306 in communication via network 302, and/or other components. Tabular data module 304 and object based data module 306 are illustrated in FIG. 1 as separate from computer system 310 and user device 340. In some implementations, data modules 304, 306 may be stored on the computer system 310, user device 340, or at a remote location.

Tabular data module 304 may be a computer memory configured to store data. Tabular data module 304 may store a data set formatted with a tabular structure. A tabular data structure may be defined by a data schema, encompassing data schema related information including at least the names of the columns of the table, the data types of the columns, user descriptions of the columns, etc.

Object based data module 306 may be a computer memory configured to store data. Object based data module 306 may store a data set formatted with an object based structure according to an ontology, as described, e.g., with respect to FIG. 1.

Computer system 310 may be configured as a server (e.g., having one or more server blades, processors, etc.), a personal computer (e.g., a desktop computer, a laptop computer, etc.), a smartphone, a tablet computing device, and/or other device that can be programmed to receive tabular data, generate script editing tools, and transform the tabular data into object based data.

Figure 5:
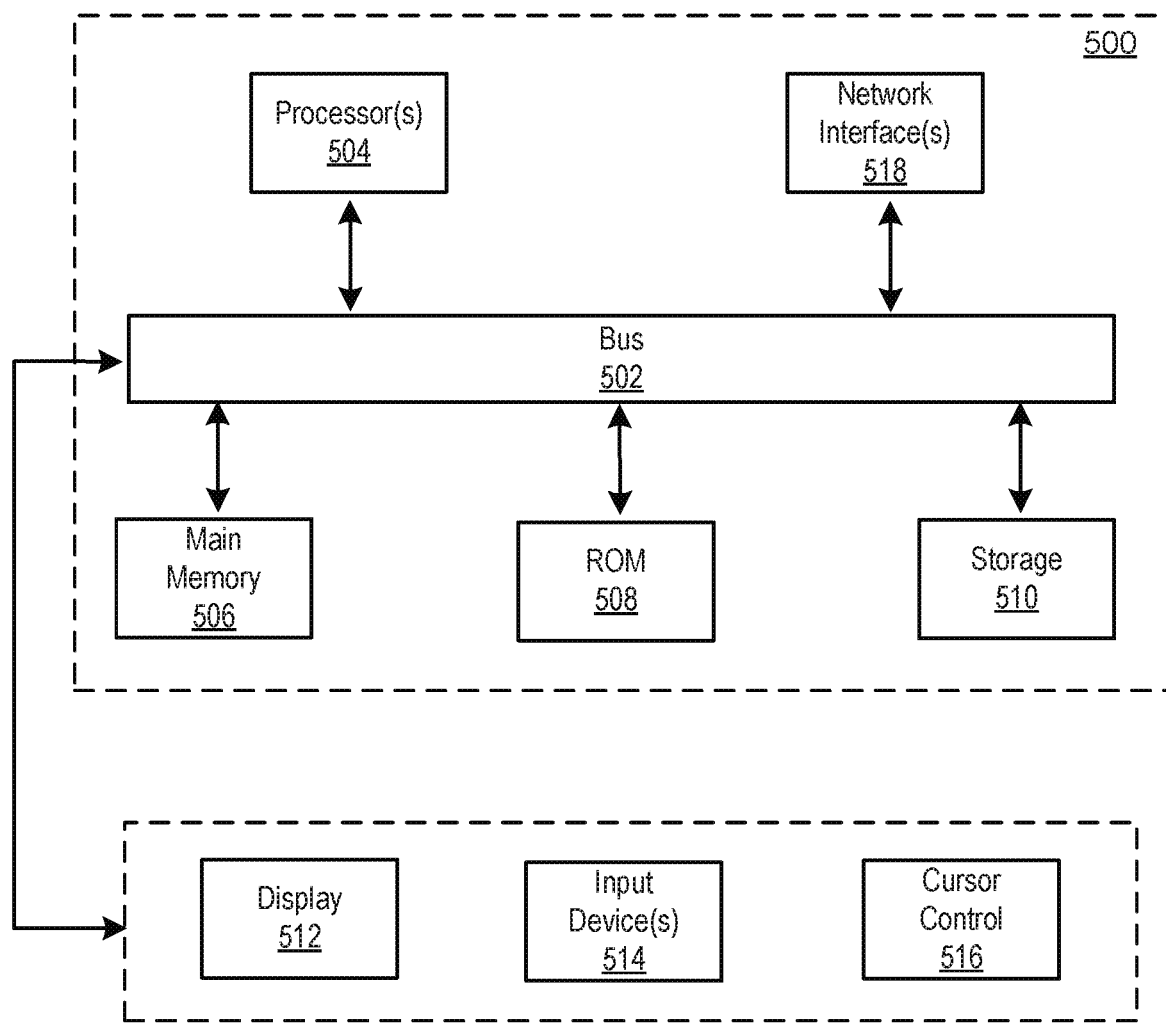
FIG. 5 depicts a block diagram of an example computer system in which any of the embodiments described herein may be implemented.

Computer system 310 may include one or more processors 332 (also interchangeably referred to herein as processors 332, processor(s) 332, or processor 332 for convenience), one or more storage devices 334, and/or other components. Processors 332 may be programmed by one or more computer program instructions stored on storage device 334. For example, processors 332 may be programmed by source ontology module 318, destination data set identifier module 320, dataset comparison module 322, translation module 324, trigger module 326, migration module 328, and/or other instructions that program computer system 310 to perform various operations, each of which are described in greater detail herein. As used herein, for convenience, the various instruction modules will be described as performing an operation, when, in fact, the various instructions program the processors 332 (and therefore computer system 310) to perform the operation. Further details and features of a computer system 310 configured for implementing features of the described technology may be understood with respect to computer system 500 as illustrated in FIG. 5.

User device 340 may be configured as a server device, a gaming console, a handheld gaming device, a personal computer (e.g., a desktop computer, a laptop computer, etc.), a smartphone, a tablet computing device, and/or other device that can be programmed to receive tabular data, generate script editing tools, and transform the tabular data into object based data.

User device 340 may include one or more processors 342 (also interchangeably referred to herein as processors 342, processor(s) 342, or processor 342 for convenience), one or more storage devices 344, and/or other components. Processors 342 may be programmed by one or more computer program instructions. For example, processors 342 may be programmed by source ontology module 318, destination data set identifier module 320, dataset comparison module 322, translation module 324, trigger module 326, migration module 328, and/or other instructions that program computer systems 310 to perform various operations, each of which are described in greater detail herein. As used herein, for convenience, the various instruction modules will be described as performing an operation, when, in fact, the various instructions program the processors 342 (and therefore user device 340) to perform the operation.

Various aspects of the transform facilitation system may operate on computer system 310 and/or on user device 340. That is, the various modules described herein may each operate on one or both of computer system 310 and/or user device 340. For example, in one implementation, a user device 340 comprising a client side laptop computer may run a trigger module 326 and migration module 328, while other aspects of the system are run on computer system 310, acting as a server.

Source ontology module 318 may be a software module in operation on computer system 310 and/or on user device 340. Source ontology module 318 may include programming instructions that cause the system to receive, acquire, obtain, or otherwise gain access to a source ontology for a source stack. The source ontology may define one or more source objects for the source stack. The one or more source objects may be associated with source datasets having source dataset identifiers. The source datasets may correspond to destination datasets on a destination stack. Corresponding datasets may be identical and/or have the same relative locations within their respective stacks. The destination datasets may have destination dataset identifiers that are different from the source dataset identifiers and/or do not match the source dataset identifiers despite the datasets corresponding.

In some embodiments, the source stack may comprise a development stack, and the destination stack may comprise a production stack. By way of example, a developer may be able to develop, update, and/or test a software solution, application, and/or platform on a development stack and/or publish the software solution, application, and/or platform via the production stack. By way of another example, the destination stack may comprise a backup stack in case something goes wrong with the source stack. As such, the source ontology created on the source stack may need to be migrated to the destination stack. In some implementations, responsive to migration of the source ontology to the destination stack, all, or one or more portions of the source ontology may match the destination ontology for the destination stack.

Destination dataset identifier module 320 may be a software module in operation on computer system 310 and/or on user device 340. Destination dataset identifier module 320 may include programming instruction that cause computer system 310 and/or user device 340 to receive, acquire, obtain, or otherwise gain access to the destination dataset identifiers for the destination datasets.

The destination dataset identifiers for the destination datasets may be different from the source dataset identifiers for the source datasets. Dataset identifiers may reference one or more datasets behind an object. In some embodiments, the identifiers may be stack-specific such that they are unique to a given stack. As such, the source ontology defining the source objects cannot merely be transferred to another stack because the one or more datasets behind the objects defined by the source ontology will be referenced incorrectly for the destination stack.

In some embodiments, destination dataset identifier module 320 may be configured to receive secondary destination dataset identifiers. The secondary destination dataset identifiers may be for secondary destination datasets on a second destination stack. The source ontology may be migrated to the second destination stack and/or other destination stacks responsive to the datasets corresponding.

Dataset comparison module 322 may further be configured to translate the destination data set identifiers. The destination dataset identifiers may be translated into updated destination data set identifiers that correspond to the source data identifiers. The destination dataset identifiers may be translated based on relative locations of the datasets within the stacks. For example, the destination dataset identifiers may be translated based on the relative locations of the source datasets within the source stack based on the fact that the destination datasets correspond to the source datasets and/or are located within the same relative location within the destination stack.

In some embodiments, dataset comparison module 322 may be configured to identify a first relative location of a source data set on the source stack. The second relative location of a destination dataset on the destination stack may be identified. Dataset comparison module 322 may further be configured to compare the first relative location and the second relative location to determine whether or not the relative locations of the datasets within the stacks correspond to each other. If the source datasets and the destination datasets are the same and the relative locations of the source datasets correspond to the relative locations of the destination datasets, it may be possible to migrate the source ontology to the destination stack.

In some embodiments, dataset comparison module 322 may be configured determine an offset of the second relative location to the first relative location based on the comparison. Responsive to a determination that the second relative location is different from the first relative location (in relation to the destination stack and the source stack respectively), an offset may be determined and/or applied to the destination stack and or the destination datasets to move the second relative location such that it corresponds with the first relative location. The offset may be determined based on the difference between the first relative location in relation to the source stack and the second relative location in relation to the destination stack.

Translation module 324 may be a software module in operation on computer system 310 and/or on user device 340. Translation module 324 may include programming instruction that cause computer system 310 to translate the destination dataset identifiers into updated destination dataset identifiers.

The updated destination data set identifiers may correspond to the source dataset identifiers. The updated destination dataset identifiers may include one or more of the same references to the one or more datasets behind an object as the source dataset identifiers such that the source ontology can be migrated to the destination stack and will reference the datasets behind the destination objects corresponding to the source objects correctly.

In some embodiments, translation module 324 may be configured to translate one or more links between the source objects and/or the source ontology. The one or more links may be separate from the dataset identifiers. The links may define how one or more objects linked to one another and/or within the ontology. The one or more links may be translated from the source stack to the destination stack based on the source ontology.

In other embodiments, translation module 324 may further be configured to translate the secondary destination dataset identifiers into updated secondary destination dataset identifiers. The secondary destination dataset identifiers may be translated based on relative locations of the datasets within the stacks. For example, the secondary destination dataset identifiers may be translated based on the relative locations of the source datasets within the source stack responsive to the secondary destination datasets corresponding to the source datasets and/or are being located within the same relative location within the second destination stack.

In some embodiments, translation module 324 may further be configured to apply the offset determined by dataset comparison module 322. The offset may be applied to the destination stack to move the second relative location. Moving the second relative location may include actually moving the location of the destination dataset on the destination stack, or applying an offset such that translation of the destination dataset identifiers reflects the offset.

Trigger module 326 may be a software module in operation on computer system 310 and/or on user device 340. Trigger module 326 may include programming instruction that cause computer system 310 to trigger migration of the source ontology to the source stack.

In some embodiments, translation of the destination dataset identifiers into the updated destination dataset identifiers may be responsive to identification of a trigger event by trigger module 326. A trigger event may include one or more of user input initiating migration of the source ontology to the destination stack; one or more updates to the source ontology, the source stack, and/or the destination stack; the passage of an interval of time; the arrival of a predetermined date and/or time; and/or other trigger events.

Trigger module 326 may further be configured to trigger and/or initiate migration of the source ontology to the destination stack based on one or more predetermined settings defining the trigger event(s). Developers and/or users may be able to define and/or indicate what constitutes a trigger event. By way of example, trigger module 326 may be configured to initiate migration of the source ontology to the destination stack on a continuous and/or semi-continuous basis (e.g., every hour, day, week, and/or other interval of time). By way of another example, trigger module 326 may be configured to initiate migration of the source ontology to the destination stack responsive to the developer updating and/or changing the source ontology.

Migration module 328 may be a software module in operation on computer system 310 and/or on user device 340. Migration module 328 may include programming instruction that cause computer system 310 and/or user device 340 to migrate the source ontology to the destination stack. The source ontology may be migrated to the destination stack based on translation of the destination dataset identifiers. The source ontology being migrated to the destination stack based on translation of the destination dataset identifiers may include migrating the source ontology to the destination stack based on the relative locations of the datasets within the given stacks.

In some embodiments, migration module 328 may be configured to receive user input indicating one or more source objects to be migrated to the destination stack. By way of example, the source ontology may be migrated to the destination stack responsive to determining (by dataset comparison module 322) the first relative location of the source dataset on the source stack is the same as the second relative location of the destination dataset on the destination stack. In other words, the source ontology may be migrated to the destination stack responsive to determining the source datasets within the source stack of the same locations within the source stack as the destination datasets have within the destination stack. The source ontology may be migrated to the destination stack responsive to the relative locations of the datasets in the source stack corresponding to the relative locations of the datasets in the destination stack.

In some embodiments, migration module 328 may be configured to receive user input indicating one or more source objects to be migrated to the destination stack. The user input may be received via a graphical user interface displaying one or more source objects or indications of source objects. The graphical user interface may be configured to receive user input indicating one or more of the source objects to be migrated to the destination stack via migrating the source ontology.

In some embodiments, migration module 328 may be configured to receive user input indicating one or more source objects to be excluded from migration to the destination stack. The user input may be received via a graphical user interface displaying one or more source objects or indications of source objects. The graphical user interface may be configured to receive user input indicating one or more of the source objects to be excluded from migration to the destination stack via migrating the source ontology.

In some embodiments, migration module 328 may further be configured to migrate the source ontology to the second destination stack, and/or other destination stacks based on translation of the secondary destination dataset identifiers. The source ontology may be migrated from the source stack to any number of destination stacks responsive to translating the dataset identifiers associated with the datasets for a given stack.

In some implementations, the source ontology may be migrated to the destination stack responsive to identification of a trigger event by trigger module 326. As such, the source ontology may be migrated to one or more destination stacks automatically, or on a continuous or semi-continuous basis.

Although illustrated in FIG. 3 as a single component, computer system 310 and user device 340 may each include a plurality of individual components (e.g., computer devices) each programmed with at least some of the functions described herein. In this manner, some components of computer system 310 and/or user device 340 may perform some functions while other components may perform other functions, as would be appreciated. The one or more processors 332 may each include one or more physical processors that are programmed by computer program instructions. The various instructions described herein are exemplary only. Other configurations and numbers of instructions may be used, so long as the processor(s) 332 are programmed to perform the functions described herein.

Furthermore, it should be appreciated that although the various instructions are illustrated in FIG. 3 as being co-located within a single processing unit, in implementations in which processor(s) 332 includes multiple processing units, one or more instructions may be executed remotely from the other instructions.

Additionally, the modular software breakdown as illustrated in FIG. 3 is prepared for illustrative purposes only. The various instructions described with respect to specific software modules may be implemented by alternative software modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 332 may be programmed by one or more additional instructions that may perform some or all of the functionality attributed herein to one of the instructions.

The various instructions described herein may be stored in a storage device 334, which may comprise random access memory (RAM), read only memory (ROM), and/or other memory. The storage device may store the computer program instructions (e.g., the aforementioned instructions) to be executed by processor 332 as well as data that may be manipulated by processor 332. The storage device may comprise floppy disks, hard disks, optical disks, tapes, or other storage media for storing computer-executable instructions and/or data.

The various components illustrated in FIG. 3 may be coupled to at least one other component via a network 302, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 3, as well as in other drawing Figures, different numbers of entities than those depicted may be used. Furthermore, according to various implementations, the components described herein may be implemented in hardware and/or software that configure hardware.

Figure 4:
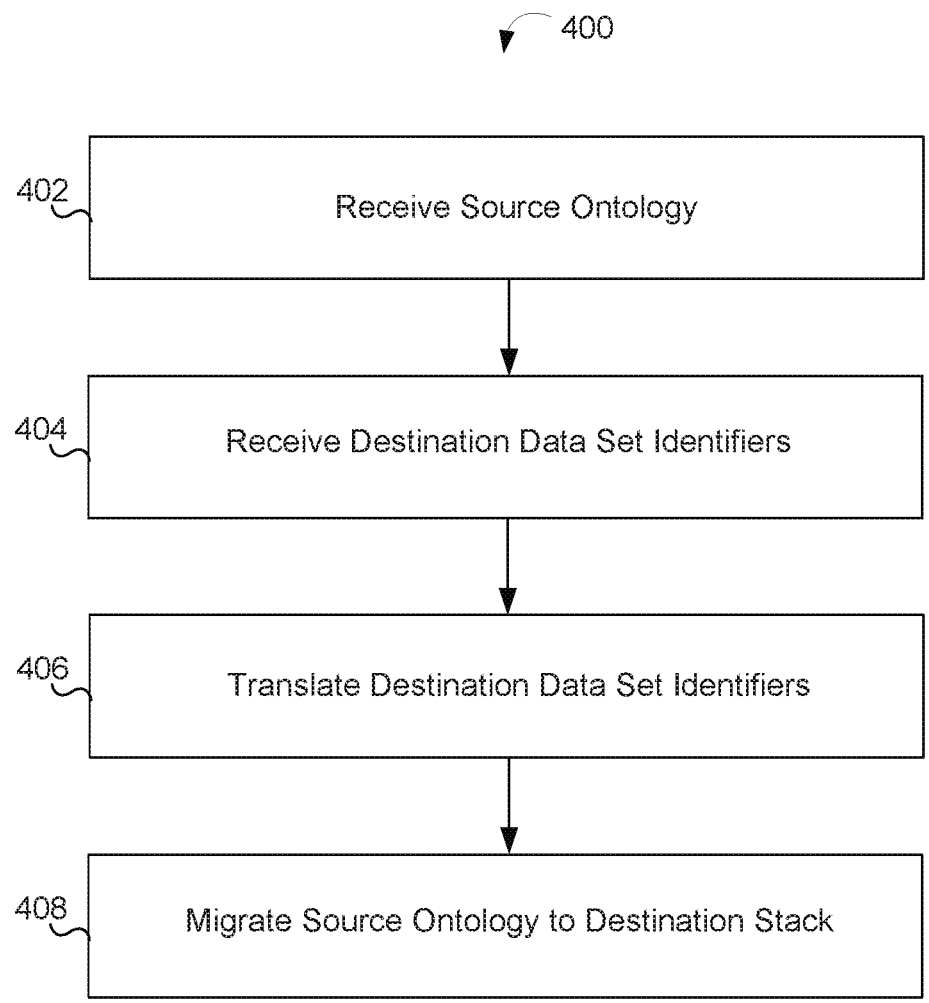
FIG. 4 depicts a process flow chart of a method for migrating an ontology, according to some implementations.

FIG. 4 depicts a process flow chart of a method for ontology migration, according to some implementations. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, ontology migration process 400 may include receiving a source ontology for a source stack. The source ontology may be received by source ontology module 318. The source ontology may define source objects associated with for status. The source datasets may correspond to destination dataset on a destination stack. The source datasets may have source dataset identifiers that are different from destination dataset identifiers for the destination datasets. In some implementations, receiving the source ontology may include obtaining and/or obtaining access to the source ontology. A source ontology module the same as or similar to source ontology module 318 may be configured to perform operation 402.

In an operation 404, ontology migration process 400 may include receiving the destination dataset identifiers. Receiving the destination dataset identifiers may include obtaining, accessing, and/or otherwise acquiring the destination dataset identifiers for the destination datasets on the destination stack. A destination dataset identifier module the same as or similar to destination dataset identifier module 320 may be configured to perform operation 404.

In an operation 406, ontology migration process 400 may include translating the destination dataset identifiers into updated destination dataset identifiers. The updated destination dataset identifiers may correspond to the source dataset identifiers. The destination doesn't identifiers may be translated into updated destination dataset identifiers based on the relative locations of the source datasets within the source stack and/or the relative locations of the destination data sets within the destination stack. A translation module the same as or similar to translation module 324 may be configured to perform operation 406.

In an operation 408, ontology migration process 400 may include migrating the source ontology to the destination stack. Source ontology may migrated to the destination stack based on translation of the destination dataset identifiers (e.g., the relative location of the source datasets within the source stack and/or the relative locations of the destination datasets within the destination stack). In some embodiments, the source ontology may be migrated to destination stack based on user input. The source ontology may be migrated to the destination stack responsive to identification of a trigger event by trigger module 326. A migration module the same as or similar to migration module 328 may be configured to perform operation 408.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system for migrating an ontology, the system comprising: one or more processors; and
   a memory storing instructions that, when executed by the one or more processors, cause the system to:
      receive a source ontology for a source stack, the source ontology defining source objects that are associated with source data sets having source data set identifiers, wherein the source data sets correspond to destination data sets on a destination stack, and wherein the destination data sets have destination data set identifiers that are different than the source data set identifiers;
      receive the destination data set identifiers;
      translate the destination data set identifiers into updated destination data set identifiers such that the updated destination data set identifiers correspond to the source data set identifiers;
      translate links between the source objects and the source ontology and information relating to the symmetry of the links;
      migrate, based on the translation of the destination data set identifiers, the source ontology to the destination stack; and
      migrate the links to the destination stack while preserving an organization between the source objects based on the information relating to the symmetry of the links.

2. The system of claim 1, wherein the source stack comprises a development stack and the destination stack comprises a production stack.

3. The system of claim 1, wherein the instructions further cause the system to:
receive user input indicating selection of one or more source objects to be migrated to the destination stack, wherein the migration of the source ontology to the destination stack is further based on the user input such that the one or more source objects indicated by the user input are migrated to the destination stack.

4. The system of claim 1, wherein the instructions further cause the system to:
receive user input indicating one or more source objects to be excluded from migration to the destination stack, wherein the migration of the source ontology to the destination stack is further based on the user input such that the one or more source objects indicated by the user input are excluded from migration to the destination stack.

5. The system of claim 1, wherein the translation of the destination data set identifiers into updated destination data set identifiers further causes the system to:
identify a first relative location of the source data set on the source stack;
identify a second relative location of the destination data set on the destination stack; and
compare the first relative location and the second relative location.

6. The system of claim 5, wherein to migrate the source ontology to the destination stack, the instructions further cause the system to migrate the source ontology to the destination stack in response to determining, based on the comparison, the first relative location is the same as the second relative location.

7. The system of claim 5, wherein responsive to determining, based on the comparison, the first relative location is different from the second relative location, the instructions further cause the system to:
determine an offset of the second relative location to the first relative location based on the comparison;
apply the offset to the destination stack to move the second relative location; and
migrate the source ontology to the destination stack.

8. The system of claim 1, wherein the instructions further cause the system to:
receive secondary destination data set identifiers for secondary destination data sets on a second destination stack;
translate the secondary destination data set identifiers into updated secondary destination data set identifiers such that the updated secondary destination data set identifiers correspond to the source data set identifiers; and
migrate, based on translation of the secondary destination data set identifiers, the source ontology to the second destination stack.

9. The system of claim 1, wherein the instructions further cause the system to:
identify a trigger event,
wherein the translation of the destination data set identifiers into the updated destination data set identifiers is responsive to the identification of the trigger event, and
wherein the source ontology is migrated to the destination stack responsive to the identification of the trigger event.

10. A computer-implemented method of migrating an ontology, the method being performed on a computer system having one or more physical processors programmed with computer program instructions that, when executed by the one or more physical processors, cause the computer system to perform the method, the method comprising:
receiving a source ontology for a source stack, the source ontology defining source objects that are associated with source data sets having source data set identifiers, wherein the source data sets correspond to destination data sets on a destination stack, and wherein the destination data sets have destination data set identifiers that are different than the source data set identifiers;
receiving the destination data set identifiers;
translating the destination data set identifiers into updated destination data set identifiers such that the updated destination data set identifiers correspond to the source data set identifiers, wherein the translating comprises:
in response to the source data sets not being identical to the destination data sets:
comparing a first relative location of the source data sets on the source stack with a second relative location of the destination data sets on the destination stack;
determining an offset of the second relative location to the first relative location based on the comparison; and
applying the offset to the destination stack to move the second relative location; and
migrating, based on the translation of the destination data set identifiers, the source ontology to the destination stack.

11. The method of claim 10, wherein the source stack comprises a development stack and the destination stack comprises a production stack.

12. The method of claim 10, further comprising receiving user input indicating selection of one or more source objects to be migrated to the destination stack, wherein the migration of the source ontology to the destination stack is further based on the user input such that the one or more source objects indicated by the user input are migrated to the destination stack.

13. The method of claim 10, further comprising receiving user input indicating one or more source objects to be excluded from migration to the destination stack, wherein the migration of the source ontology to the destination stack is further based on the user input such that the one or more source objects indicated by the user input are excluded from migration to the destination stack.

14. The method of claim 10, wherein the migrating further comprises migrating the source ontology to the destination stack in response to determining, based on the comparison, the first relative location is the same as the second relative location.

15. The method of claim 10, further comprising:
determining, based on the comparison, the first relative location is different than the second relative location.

16. The method of claim 10, further comprising:
translating links between the source objects and the source ontology; and
migrating the links to the destination stack.

17. The method of claim 10, further comprising:
receiving secondary destination data set identifiers for secondary destination data sets on a second destination stack;
translating the secondary destination data set identifiers into updated secondary destination data set identifiers such that the updated secondary destination data set identifiers correspond to the source data set identifiers; and migrating, based on translation of the secondary destination data set identifiers, the source ontology to the second destination stack.

18. The method of claim 10, further comprising:
identifying a trigger event,
wherein the translation of the destination data set identifiers into the updated destination data set identifiers is responsive to the identification of the trigger event, and
wherein the source ontology is migrated to the destination stack responsive to the identification of the trigger event.

19. A system for migrating an ontology, the system comprising: one or more processors; and
a memory storing instructions that, when executed by the one or more processors, cause the system to:
receive a source ontology for a source stack, the source ontology defining source objects that are associated with source data sets having source data set identifiers, wherein the source data sets correspond to destination data sets on a destination stack, and wherein the destination data sets have destination data set identifiers that are different than the source data set identifiers;
receive the destination data set identifiers;
translate the destination data set identifiers into updated destination data set identifiers such that the updated destination data set identifiers correspond to the source data set identifiers, wherein the translating comprises:
in response to the source data sets not being identical to the destination data sets:
comparing a first relative location of the source data sets on the source stack with a second relative location of the destination data sets on the destination stack;
determining an offset of the second relative location to the first relative location based on the comparison; and
applying the offset to the destination stack to move the second relative location; and
migrate, based on the translation of the destination data set identifiers, the source ontology to the destination stack.

* * * * *